Patented Feb. 14, 1939

2,147,521

UNITED STATES PATENT OFFICE 2,147,521

CITRUS-CEREAL BREAKFAST FOOD AND METHOD OF MAKING SAME

Ramon Bustamante, Tampa, Fla., assignor to Florida Citrus Exchange, Tampa, Fla., a corporation of Florida No Drawing. Application February 1, 1938, Serial No. 188,183

4 Claims. (Cl. 99—83)

This invention relates to a citrus-cereal breakfast food, both the product and process of making the same.

One of the objects of the invention is the utilization of substantially the entire citrus fruit, both its solid and liquid content, in conjunction with cereal and other nutritive ingredients, in the manufacture of a granular breakfast food characterized by crunchiness, crispness, low hygroscopicity with the palatable flavor of the fresh citrus fruit, devoid of bitterness or other objectionable taste characteristics.

Another object of the invention is the provision of a process for the manufacture of a citrus cereal breakfast food of the type described, which makes it possible to produce a product which is standardized as regards those factors such as flavor, hygroscopicity, etc., which ordinarily would be variably affected by seasonal and other variations in the chemical or physical qualities of the citrus fruit.

Still another object of the invention is the provision of a process for making a citrus fruit flour substantially free from pectose, pectin, pectate acid, fruit oil, and the biter fruit flavor principles, and therefore standardized as regards flavor and minimum hygroscopicity.

A further object of the invention is the production of a citrus fruit flour made from the entire solid constituents of the fruit, substantially free from pectin or pectous compounds, fruit oils, naringin, hesperidin, or other bitter flavoring and therefore of standard composition regardless of seasonal variations in the chemical or physical constituency of the fruit from which it is made.

Other objects of the invention will appear as the following description proceeds.

This application for patent is a continuation-in-part of my application Serial No. 154,317, filed July 17, 1937.

While the invention contemplates the employment of any species or variety of citrus fruits and perhaps other fruits, a breakfast food embodying oranges as its foundation, and the process of manufacturing this orange breakfast food will be particularly described herein for the purpose of illustrating the invention.

Oranges have a maturing season extending over a period of several months and the chemical and physical constituency of the orange varies greatly during that period, not only due to the stage of maturity of the orange, but to other factors such as the amount of rainfall, sunshine, periods of abnormal heat or cold, etc., and if breakfast food were made employing oranges just as they are gathered from time to time during the maturing season, the product would be unstandardized both as to flavor, crispness, its affinity for moisture, etc.

In its commercial phases therefore the process involves the breaking down of the orange into two fractions which can be separately treated so as to secure substantially uniform standardization of the product. These two fractions are the juice and the solid residue of the orange remaining after the extraction of the juice.

In carrying out the process, the oranges are washed and put whole into a grinder or mill so designed as to press and strain the juice from the oranges and to crush, grind or otherwise comminute the seeds, rind and pulp.

The juice strained of seeds is collected in suitable containers and can sugar or honey added thereto in sufficient quantity to bring the solution up to the required Brix test. The amount of sugar or honey to be added is determined in accordance with the amount of natural sugar present in the juice and the degree of sweetness desired. The juice is then concentrated to a specific gravity of substantially 1.2 by boiling in a vacuum pan at a temperature sufficiently low to preserve the vitamin C content of the juice. In this boiling, the oil of the rind is evaporated off almost entirely from the juice and may, if desired, be separately condensed and disposed of as a by-product. The resulting product because of its concentration and sugar content can be preserved indefinitely in drums or other suitable containers at storage temperatures or from about 50° to 60°. In the manufacture of the breakfast food this supply of juice, which can always be prepared to a uniform standard, can be drawn upon as required.

The solid residue consisting of the rind, pulp-rag and seeds, all in finely comminuted form is treated for the removal of the pectin, the orange oil and the naringin. With this end in view, it is run into suitable vats, water being added in an amount sufficient to permit the mass to be stirred easily.

Depending upon the maturity of the fruit, pectin is present largely in the rind in variable degrees of solubility. Immature fruit contains water-insoluble pectose which after the fruit matures is converted into pectin and in over-maturity to pectic acid. Of the pectin compounds present in the mature fruit used in the breakfast food of the present invention, it is safe to say that from 10 to 15 percent are pectose and pectin, which are insoluble in water. If this material is allowed to remain in its natural state in the processing citrus flour, it multiplies the drying time and cost. Even if this factor be disregarded, and the material were to be dried in spite of the presence of water-insoluble pectose or pectin, the breakfast food would not only be a little tough, but also extraordinarily hygroscopic. These water absorbent features present costly and unnecessary packaging problems which are avoided by the removal of the pectin.

The naringin is a bitter glucoside which if present in the breakfast food causes a bitter and commercially objectionable taste.

The oil of the rind is also an objectionable feature if allowed to remain in the breakfast food in the quantities natural to the volume of food used in percentage by weight of the final product. Grinding the whole orange finely releases the oil, some of which is expressed into the juice and evaporated off as has been described while the rest of it remains in the pulp.

Alternative methods may be employed in the treatment of the pulp. In one of these methods sodium bicarbonate is added to the pulp-water mixture in sufficient amounts to neutralize the mixture. After a short time, depending upon the extent of agitation and the temperature of the mixture, the following reactions have taken place. The oil of the rind has risen to the top of the vat and may be skimmed off. Free pectin has been converted into sodium pectate which is water-soluble and is in solution. The naringin is naturally soluble and has leached into the solution.

When these reactions have taken place, the oil is skimmed off and the mixture run through a filter press. The liquid drawn off from this operation contains sodium pectate in liberal quantities which may be recovered as a by-product. The liquor also contains the naringin. The pressed cake of pulp, seeds and rind is then subjected to hydraulic pressure to bring it down to about 30 percent moisture content. It is then run into a drier which may be of the drum or any other heated type and dried at a temperature of about 100° to 110° F. which will bring the moisture content down to about 10 percent in a few minutes. The rough ground product at this point is to all intents and purposes, bone-dry. It is then run through a pulverizing apparatus of 200 mesh fineness so that the resulting flour is uniform, irrespective of whether the particle is from the hull, albedo, outer skin, inner rind or what not of the orange. The flour can then be sacked or put in other suitable containers and stored just as is done in any other flour for indefinite periods until required for the manufacture of the breakfast food.

It is to be understood that this method of processing the pulp, etc., into flour retains some traces of sodium pectate which are not sufficient to affect the minimum hygroscopicity of the product and which may have some health value because of the presence of the sodium.

One variant of the above method of converting the solid portions of the orange into flour is to substitute calcium hydroxide for the sodium bicarbonate. The resulting pectin salt is calcium pectate. This method may be preferable in that the trace of calcium in the flour is a desirable mineral in the building of bones in the human body.

The third method of preparing a standard orange flour makes use of no chemicals. The pulp rind and seed mixture in the vat is subjected to autolysis. In this case the vat is water jacketed so that a temperature of substantially 55° C. may be maintained. The amount of water added to the pulp is only sufficient to dilute it to a pH of 4.5. Under these conditions, the enzymes natural to the fruit cause pre-digestion of the pectin and the conversion of it into a soluble salt which is drawn off in the liquid. Concurrently, the naringin is leached out and the oil rises to the top by gravity just as in the other alternative methods of treatment.

Given these citrus ingredients, namely, the standardized dry orange flour on the one hand and the standardized concentrated juice on the other, together with other essentials, the manufacture of the breakfast food proceeds as follows: A mixture is made of the following ingredients in the weight proportions as given:

| | Grams |
|---|---|
| Orange flour | 200 |
| Concentrated juice | 856 |
| Cereal flour (whole wheat, rye, oat, corn and rice) | 300 |
| Sugar in powder form | 350 |
| Bran flour | 250 |
| Shortening | 110 |
| Salt to taste. | |
| Cod liver oil. | |

This mixture is a plastic dough mass which is baked at a suitable temperature until the consistency of the mass is brought to a point where it may be formed by extrusion or by any other suitable means, into crumbles, shreds, flakes or other forms customary in breakfast foods.

The temperature at which the mass is baked is held below any temperature which would caramelize the honey or the sugar or which would destroy the vitamin content of the product being processed. Where oranges are used as the base of the product the temperature of the baking oven should not exceed 130° F.

It is significant that the concentrated juice is the only liquid incorporated into the mixture and that this contains just enough moisture to be evaporated at about the time the flour has been converted or baked, leaving the product of the proper consistency for final granulating.

After having been formed into the crumbles, flakes, etc., as described, the product is toasted for a few minutes at 300° F. to eliminate its final moisture content and give it the necessary pleasing crispness or crunchiness desired in the commercial product.

It will be understood that in the production of a standardized product, substantially all of the oil has been eliminated, a certain percentage of which, although less than the percentage found in the natural fruit, is essential to the proper flavor. Consequently, after toasting, the product is then sprayed with orange extract, or strained orange juice from which the oil has not been eliminated. If the extract alone is used about one ounce to one kilogram of the product is applied. The product is agitated of course during the application of the spray so that each particle may be as fully coated as possible. The product is then dried so that the alcohol of the extract or the water of the sprayed juice may be eliminated. It is then ready for packaging and shipment.

The process of the present invention effects: (1) the preservation for indefinite periods of the two fractions of the orange which together constitute substantially the entire fruit, namely, the concentrated juice and the pectin-free citrus flour; (2) the employment of these fractions in the manufacture of breakfast food as a year round industry altogether independent of the fruiting season; (3) the preservation of the vitamin content of the orange; (4) the production of a product which is nourishing, palatable, possessing the crisp quality characteristic of breakfast foods and in which hygroscopicity is minimized through the substantial absence of pectin.

In carrying out the process above described, no chemical or artificial preservative, or coloring matter, or harmful foreign substances are used. Throughout the entire operation of producing the product, the temperatures employed are controlled so as to preserve the original flavor, vitamin content and natural salts of the fresh fruit being processed. A most important feature of the invention is inherent in the fact that the juice of the fresh fruit forms a binding agent for the other ingredients of the finished product. This binding effect is made possible by the evaporation of water from the juice during the baking and final drying operation.

While I have in the above description disclosed what I believe to be a preferred and practical embodiment of my invention, it will be understood that the specific details including the technique by which the process is carried out are by way of example and not to be construed as limiting the scope of the invention.

What I claim is:

1. Citrus-cereal breakfast food, a product of baked dough of pectin-free and oil-free flour of the solid parts of citrus fruits remaining after dejuicing, and cereal flour, said dough containing an impregnation of concentrated and sugar-added citrus fruit juice having fermentation-proof quality derived from the conjunctive relationship between the degree of concentration and the amount of added sugar.

2. Improvements in the art of preparing a composite citrus-cereal breakfast food in which the entire citrus fruit is incorporated, comprising dejuicing the fruit and separately treating the juice and the solid part of the fruit remaining after dejuicing, by freeing the said solid part of pectin and oil, drying it, and comminuting it into a flour, concentrating the juice and supplementing the natural sugar in the juice with added sugar, making the juice proof against fermentative deterioration by virtue of the conjunctive relationship between the degree of concentration and the amount of added sugar, making a dough incorporating the thus treated citrus flour, the thus treated juice, and cereal flour, baking the dough and comminuting it.

3. Improvement in the art of preparing a composite citrus-cereal breakfast food in which the entire citrus fruit is incorporated, comprising dejuicing the fruit and separately treating the juice and solid part of the fruit remaining after dejuicing by freeing the solid part of pectin and oil, and drying and comminuting it into a flour, concentrating the juice and supplementing the natural sugar in the juice with added sugar, making the juice proof against fermentative deterioration by virtue of the conjunctive relationship between the degree of concentration and the amount of added sugar, concentration of the juice having been carried to the point at which the proportion of the juice employed is just enough to properly moisten the proportion of flour employed without the necessity of adding water.

4. Improvement in the art of preparing a composite citrus-cereal breakfast food in which the entire citrus fruit is incorporated, comprising dejuicing the fruit and separately treating the juice and the solid part of the fruit remaining after dejuicing by freeing said solid part of pectin and oil, and drying it and comminuting it into a flour, the drying being done at a temperature below the viable temperature limits of the vitamins therein contained, concentrating the juice and supplementing the natural sugar in the juice with added sugar, making the juice proof against fermentative deterioration by virtue of the conjunctive relationship between the degree of concentration and the amount of added sugar.

RAMON BUSTAMANTE.